United States Patent
Barr et al.

(10) Patent No.: US 7,594,225 B2
(45) Date of Patent: Sep. 22, 2009

(54) INTEGRATED SETUP FOR GENERATING CUSTOMIZATION XML

(75) Inventors: Paul C. Barr, Redmond, WA (US); John P. Jennings, Everett, WA (US); Aidan T. Hughes, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 11/019,115

(22) Filed: Dec. 20, 2004

(65) Prior Publication Data

US 2006/0136872 A1    Jun. 22, 2006

(51) Int. Cl.
  *G06F 9/445*    (2006.01)
  *G06F 9/44*    (2006.01)
(52) U.S. Cl. .................. 717/174; 717/168
(58) Field of Classification Search ......... 717/108–110, 717/114–116, 168–170, 171–178
See application file for complete search history.

(56) References Cited

U.S. PATENT DOCUMENTS

| | | | |
|---|---|---|---|
| 5,325,533 A | 6/1994 | McInerney et al. | |
| 5,680,619 A | 10/1997 | Gudmundson et al. | |
| 5,956,481 A | 9/1999 | Walsh et al. | |
| 6,073,214 A * | 6/2000 | Fawcett | 711/133 |
| 6,161,218 A | 12/2000 | Taylor | |
| 6,256,668 B1 | 7/2001 | Slivka et al. | |
| 6,266,811 B1 * | 7/2001 | Nabahi | 717/174 |
| 6,487,713 B1 | 11/2002 | Cohen et al. | |
| 6,601,233 B1 | 7/2003 | Underwood | |
| 6,854,061 B2 * | 2/2005 | Cooper et al. | 713/190 |
| 6,931,625 B1 | 8/2005 | Coad et al. | |
| 6,934,933 B2 * | 8/2005 | Wilkinson et al. | 717/121 |
| 6,957,256 B1 * | 10/2005 | Bradley et al. | 709/223 |
| 6,968,539 B1 * | 11/2005 | Huang et al. | 717/115 |
| 6,993,657 B1 * | 1/2006 | Renner et al. | 713/182 |
| 7,000,230 B1 * | 2/2006 | Murray et al. | 717/172 |
| 7,007,278 B2 * | 2/2006 | Gungabeesoon | 719/311 |
| 7,043,715 B1 * | 5/2006 | Bauer et al. | 717/107 |
| 7,055,146 B1 | 5/2006 | Durr et al. | |
| 7,073,126 B1 * | 7/2006 | Khandekar | 715/709 |
| 7,073,172 B2 | 7/2006 | Chamberlain | |
| 7,100,159 B2 * | 8/2006 | Claiborne | 717/174 |
| 7,127,712 B1 | 10/2006 | Noble et al. | |
| 7,149,789 B2 * | 12/2006 | Slivka et al. | 709/219 |
| 7,174,370 B1 * | 2/2007 | Saini et al. | 709/220 |
| 7,191,436 B1 | 3/2007 | Durr et al. | |

(Continued)

OTHER PUBLICATIONS

Shegalov et al. "XML-enabled workflow management for e-services across heterogeneous platforms", Apr. 27, 2001, Springer-Verlag New York, Inc., pp. 91-103.*

(Continued)

*Primary Examiner*—Anna Deng
(74) *Attorney, Agent, or Firm*—Lee & Hayes, PLLC

(57) ABSTRACT

An integrated application setup enables the generation and expression of application customization intent in a generic manner that is indifferent to the way in which the customization intent is implemented. A customization application integrates the process of customizing a target application with the standard setup process for the target application. The customization application allows a user to review customization options for the target application and to specify customization intent through an application configuration user interface (UI). The customization application then generates customization XML that expresses the user's customization intent.

13 Claims, 4 Drawing Sheets

U.S. PATENT DOCUMENTS

| | | | |
|---|---|---|---|
| 7,210,097 B1* | 4/2007 | Clarke et al. | 715/513 |
| 2002/0124245 A1* | 9/2002 | Maddux et al. | 717/176 |
| 2003/0009429 A1* | 1/2003 | Jameson | 706/45 |
| 2003/0033597 A1 | 2/2003 | Allsop et al. | |
| 2003/0167463 A1 | 9/2003 | Munsil et al. | |
| 2003/0225866 A1 | 12/2003 | Hudson | |
| 2004/0199615 A1* | 10/2004 | Philyaw | 709/220 |
| 2004/0225671 A1* | 11/2004 | Carroll et al. | 707/101 |
| 2005/0132179 A1* | 6/2005 | Glaum et al. | 713/1 |
| 2005/0193389 A1* | 9/2005 | Murphy et al. | 717/175 |
| 2005/0257208 A1 | 11/2005 | Blumfield et al. | |
| 2005/0273461 A1* | 12/2005 | Jameson | 707/3 |
| 2006/0031407 A1* | 2/2006 | Dispensa et al. | 709/219 |
| 2007/0055707 A1* | 3/2007 | Dandekar et al. | 707/200 |
| 2007/0174834 A1* | 7/2007 | Purkeypile et al. | 717/174 |
| 2008/0021778 A1* | 1/2008 | Perkowski et al. | 705/14 |

OTHER PUBLICATIONS

Bainbridge et al. "Assembling and Enriching Digital Library Collections", May 2003, IEEE Computer Society, pp. 323-334.*

Weber et al. "Live Documents with Contextual, data-Driven Information Components", Oct. 2002, ACM, pp. 236-247.*

* cited by examiner

INTEGRATED SETUP FOR GENERATING CUSTOMIZATION XML

TECHNICAL FIELD

The present disclosure generally relates to customizing applications, and more particularly, to generating customization XML that expresses customization intent.

BACKGROUND

Prior to installation on a computer, most applications are customized to better suit the needs of the user. Customizing applications provides a consistent experience to all users and reduces problems users have interacting with the software. Accordingly, software applications are generally deployed in a very specific manner. As an example, applications that an individual can purchase, download, and install from a Web site are typically customized by the vendor to include particular settings, preferences, defaults, etc., that are most likely to be useful to a typical end-user. In a different scenario, administrators responsible for deploying applications to client computers across large organizations typically pre-configure customizations in a manner to best suit various targeted groups of users. Thus, customization settings made for a particular application may be different for a group of users in the accounting department than for a group of users in the engineering department.

Current methods for implementing application customizations have various disadvantages. For example, one exemplary method for customizing an application requires a set of tools to implement the customizations. The customization tools are not included with the application itself, but instead must be accessed separately by a user or administrator before any customizations can be made. In addition, the customization tools work separately from one another and their applicability depends upon whether or not the application has already been installed.

In a pre-installation scenario, for example, using Windows Installer (MSI), available from Microsoft® Corporation of Redmond, Wash., a customization installation tool is used to read information from an application installation package (i.e., an MSI package) and present customization options to a user or administrator. The customization installation tool generates a transform based on input from a user that indicates the user's customization intent. The transform can be applied exclusively, and only one time, to the application installation package. Applying the transform to the installation package results in the software application being installed on a computer with the customizations specified during the pre-installation customization session. However, once the application is installed, the customization installation tool cannot be used again to update, alter, or fix customizations should the need arise due to an inadvertent customization mistake or customization requirements that may change over time.

Once an application has been installed, any changes to the customizations require the use of a second, post-installation customization tool. For example, if an administrator forgot to turn off a particular setting in the application during the above pre-installation customization session, he would have to start a new customization process over again, using a different post-installation customization tool. In a post-installation customization session, the post-installation customization tool generates a maintenance file that is loaded onto the computer to make changes to the application customizations according to the user's intent as entered during the post-installation customization session. Unlike the transform noted above in the pre-installation customization, the maintenance file can be used multiple times per product to make changes to the application customizations. However, each time a need arises to make additional changes to the customizations, an administrator must begin from scratch, using the post-installation customization tool to make appropriate customization alterations.

Thus, a significant disadvantage with current customization methods is that a user's/administrator's customization intent is tied exclusively to a particular manner of implementation. Any adjustment to that customization intent requires that the particular method of implementation be exercised again in its entirety. Another disadvantage is the disjointed manner in which customizations are made. That is, the use of pre- and post-installation customization tools requires that a user or administrator become familiar with two different tools in order to implement customizations on an application. Other disadvantages with current customization methods are that they are not integrated with the standard setup procedures of the applications and the customization tool(s) themselves must be accessed separately from the application media.

Accordingly, a need exists for an integrated application setup that expresses application customization intent in an agnostic manner that is indifferent to the way in which the customization intent is implemented.

SUMMARY

A system and methods provide an integrated application setup that enables the expression of application customization intent in a generic manner that is indifferent to how the customization intent is implemented and when the customization intent is applied as customizations. A customization application integrates the process of customizing a target application with the standard setup process for the target application. The customization application allows a user to review customization options for the target application and to specify customization intent through an application configuration user interface (UI). The customization application then generates customization XML that expresses the user's customization intent.

The customization XML is not committed to supporting any particular manner of customization implementation, but instead can be used to generate customizations using arbitrary technologies. The customization XML can also be used for logging and to review customization modifications previously made to a target application. In this respect, the customization application consumes pre-existing customization XML that contains previously generated customization intent, and presents the previous customization intent to a user via the application configuration UI. The user can modify the previous customizations shown in the UI to indicate a new customization intent. The customization application then generates new customization XML that expresses the user's new customization intent.

BRIEF DESCRIPTION OF THE DRAWINGS

The same reference numerals are used throughout the drawings to reference like components and features.

DETAILED DESCRIPTION

Introduction

The following discussion is directed to a system and methods that enable capturing a user's intent for customizing an application in a single, integrated customization and setup process. The user's customization intent is then expressed generically through customization XML that can be used in various ways and by various technologies to implement the customization intent in the application.

Advantages of the described system and methods include an integrated application setup and customization experience for users and administrators, an ability to go back and review previous customization intent and alter the previous customization intent if desired, and a decoupling of customization intent from the particular customization technology used to implement that intent within the application being customized.

Exemplary Computing Environment

Figure 1:
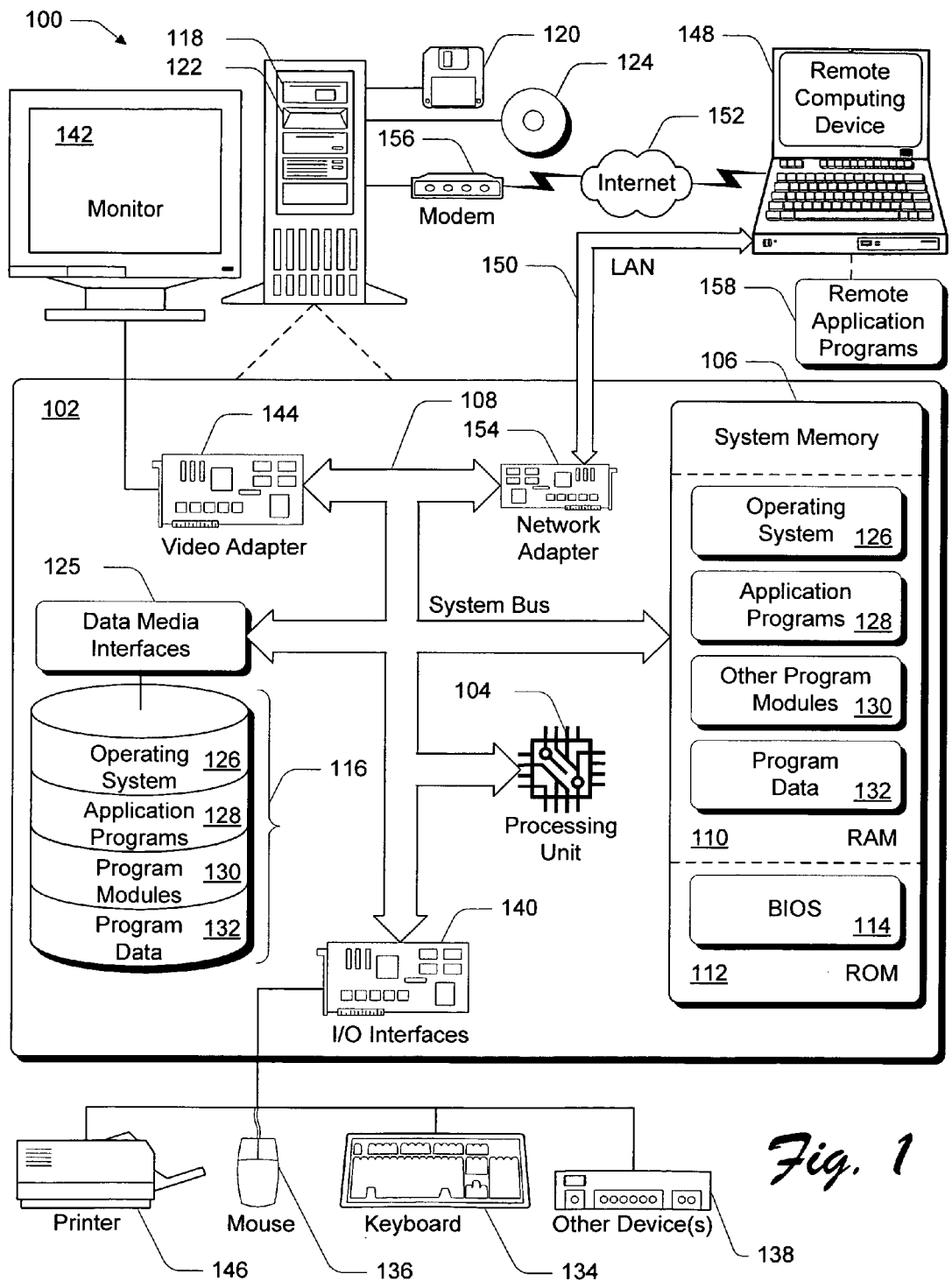
FIG. 1 illustrates an exemplary computing environment suitable for implementing an integrated application setup for generating customization XML.

FIG. 1 illustrates an exemplary computing environment suitable for implementing an integrated application setup for generating customization XML. Although one specific configuration is shown in FIG. 1, such computing devices may be implemented in other computing configurations.

The computing environment 100 includes a general-purpose computing system in the form of a computer 102. The components of computer 102 may include, but are not limited to, one or more processors or processing units 104, a system memory 106, and a system bus 108 that couples various system components including the processor 104 to the system memory 106.

The system bus 108 represents one or more of any of several types of bus structures, including a memory bus or memory controller, a peripheral bus, an accelerated graphics port, and a processor or local bus using any of a variety of bus architectures. An example of a system bus 108 would be a Peripheral Component Interconnects (PCI) bus, also known as a Mezzanine bus.

Computer 102 includes a variety of computer-readable media. Such media can be any available media that is accessible by computer 102 and includes both volatile and non-volatile media, removable and non-removable media. The system memory 106 includes computer readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during start-up, is stored in ROM 112. RAM 110 contains data and/or program modules that are immediately accessible to and/or presently operated on by the processing unit 104.

Computer 102 may also include other removable/non-removable, volatile/non-volatile computer storage media. By way of example, FIG. 1 illustrates a hard disk drive 116 for reading from and writing to a non-removable, non-volatile magnetic media (not shown), a magnetic disk drive 118 for reading from and writing to a removable, non-volatile magnetic disk 120 (e.g., a "floppy disk"), and an optical disk drive 122 for reading from and/or writing to a removable, non-volatile optical disk 124 such as a CD-ROM, DVD-ROM, or other optical media. The hard disk drive 116, magnetic disk drive 118, and optical disk drive 122 are each connected to the system bus 108 by one or more data media interfaces 125. Alternatively, the hard disk drive 116, magnetic disk drive 118, and optical disk drive 122 may be connected to the system bus 108 by a SCSI interface (not shown).

The disk drives and their associated computer-readable media provide non-volatile storage of computer readable instructions, data structures, program modules, and other data for computer 102. Although the example illustrates a hard disk 116, a removable magnetic disk 120, and a removable optical disk 124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 116, magnetic disk 120, optical disk 124, ROM 112, and/or RAM 110, including by way of example, an operating system 126, one or more application programs 128, other program modules 130, and program data 132. Each of such operating system 126, one or more application programs 128, other program modules 130, and program data 132 (or some combination thereof) may include an embodiment of a caching scheme for user network access information.

Computer 102 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 102 via input devices such as a keyboard 134 and a pointing device 136 (e.g., a "mouse"). Other input devices 138 (not shown specifically) may include a microphone, joystick, game pad, satellite dish, serial port, scanner, and/or the like. These and other input devices are connected to the processing unit 104 via input/output interfaces 140 that are coupled to the system bus 108, but may be connected by other interface and bus structures, such as a parallel port, game port, or a universal serial bus (USB).

A monitor 142 or other type of display device may also be connected to the system bus 108 via an interface, such as a video adapter 144. In addition to the monitor 142, other output peripheral devices may include components such as speakers (not shown) and a printer 146 which can be connected to computer 102 via the input/output interfaces 140.

Computer 102 may operate in a networked environment using logical connections to one or more remote computers, such as a remote computing device 148. By way of example, the remote computing device 148 can be a personal computer, portable computer, a server, a router, a network computer, a peer device or other common network node, and the like. The remote computing device 148 is illustrated as a portable computer that may include many or all of the elements and features described herein relative to computer system 102.

Logical connections between computer 102 and the remote computer 148 are depicted as a local area network (LAN) 150 and a general wide area network (WAN) 152. Such networking environments are commonplace in offices, enterprise-wide computer networks, intranets, and the Internet. When implemented in a LAN networking environment, the computer 102 is connected to a local network 150 via a network interface or adapter 154. When implemented in a WAN networking environment, the computer 102 includes a modem 156 or other means for establishing communications over the wide network 152. The modem 156, which can be internal or external to computer 102, can be connected to the system bus 108 via the input/output interfaces 140 or other appropriate mechanisms. It is to be appreciated that the illustrated network connections are exemplary and that other means of establishing communication link(s) between the computers 102 and 148 can be employed.

In a networked environment, such as that illustrated with computing environment 100, program modules depicted relative to the computer 102, or portions thereof, may be stored in a remote memory storage device. By way of example, remote application programs 158 reside on a memory device of remote computer 148. For purposes of illustration, application programs and other executable program components, such as the operating system, are illustrated herein as discrete blocks, although it is recognized that such programs and components reside at various times in different storage components of the computer system 102, and are executed by the data processor(s) of the computer.

Exemplary Embodiments

Figure 2:
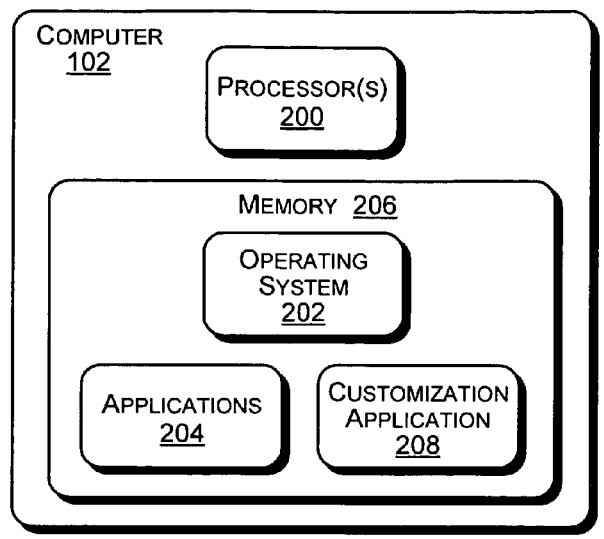
FIG. 2 illustrates an exemplary embodiment of a computer configured for implementing an integrated application setup for generating customization XML.

FIG. 2 illustrates an exemplary embodiment of a computer 102 configured for implementing an integrated application setup for generating customization XML. Computer 102 includes one or more processors 200 configured to execute an operating system 202 and various application programs 204 stored in a memory 206.

One application specifically illustrated in FIG. 2 is customization application 208. Customization application 208 is illustrated separately in FIG. 2 as a stand alone component only for the purposes of this discussion, and not for any purpose of limiting its potential configuration as being a part of an application 204, the operating system 202, and so on. Customization application 208 is generally an integral part of an application 204, or is received along with (e.g., on the same media storage device) an application 204 to help provide an integrated setup and customization experience for the application 204. This avoids the need for a user or administrator to have to acquire customization tools in addition to acquiring the application 204 itself. An application 204, including customization application 208, can be retrieved by computer 102 in various ways including, for example, by downloading them from a remote location over a network and by accessing them off of a local storage device such as a CD.

Customization application 208 is generally configured to support an application configuration user interface (UI) that enables users and administrators to customize applications during a standard application setup process. Software applications are typically customized by administrators prior to installation on a group of client computers in an organization, by individual users who purchase and install an application on a home computer, and so on. Customizations include various application settings, features, default installation states, etc., that an administrator (or user) can pre-configure in order to provide a consistent experience to all users and reduce problems that users might have when using the software. Throughout this disclosure, the term "user" is generally intended to include anyone who is setting up and customizing an application for installation on a computer. Customizing applications has greater applicability in scenarios in which an administrator is customizing an application to be deployed among one or more groups of client computers across an organization. However, customizing an application might also apply to other situations such as an individual user customizing an application for installation on a home computer, and so on.

In general, customization application 208 presents customization options for a particular application to a user through an application configuration UI. The user can make customization selections through the UI to create a record of his/her customization intent. Once the UI has captured the customization intent of the user, the customization application 208 outputs the customization intent in the form of customization XML. The customization XML is generally in the form of an XML document stored in memory, and can also be stored as an XML file. The customization XML is generic in the sense that its use is not restricted to a particular customization technology. That is, the customization XML can be used in various arbitrary customization technologies to implement the customization intent within the target application 204. The customization XML can also be used to repopulate the application configuration UI so a user can view previous customizations that were made and make changes to those previous customizations if desired.

Figure 3:
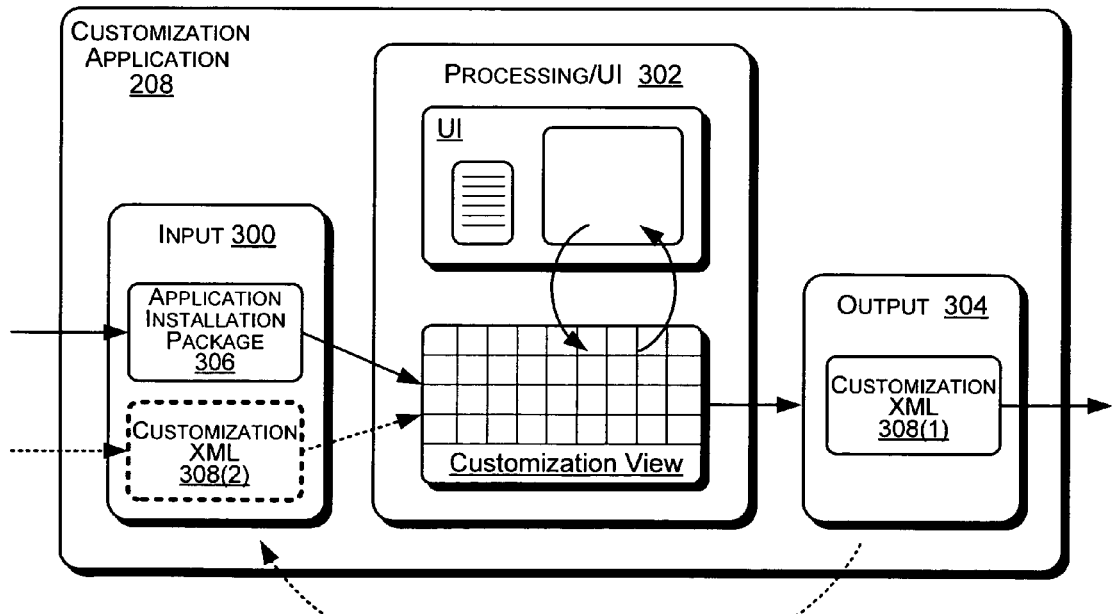
FIG. 3 illustrates detailed aspects of a customization application.

FIG. 3 illustrates functional aspects of the customization application 208 in greater detail. Customization application 208 is illustrated in FIG. 3 as including an input component 300, a processing/UI component 302, and an output component 304. Customization application 208 is typically initiated by a user running a setup routine during the installation of an application program 204. Upon initiation, customization application 208 accesses and reads as input 300, an application installation package 306 that is associated with the application program being set up. An example of an application installation package 306 is an MSI package (Microsoft Windows Installer Package). An MSI package is a database that contains a large group of instructions that indicate how a Microsoft Office product is to be installed. The application installation package 306 is a necessary input to the customization application 208.

Customization application 208 uses the application installation package 306 to populate an application configuration user interface (UI) 302. The UI 302 presents customization options to the user based on information from the application installation package 306. By interacting with the UI 302 and making customization selections through the UI, the user creates a view of the various customizations that represents the user's customization intent. As different customizations are selected and/or removed, the customization view being presented to the user through the UI 302 also changes. The process of selecting and/or removing customizations through the UI and updating the customization view is circular, as illustrated in FIG. 3. When the process of updating the customization view with the user's customization intent is complete, the output component 304 of customization application 208 outputs the user's customization intent.

The output component 304 of customization application 208 includes an XML generator that generates XML according to the customization view created by the user through the UI 302. Therefore, once a user is finished making customizations through the UI 302, the user's customization intent is captured in the form of customization XML 308. As noted above, the customization XML 308 is a generic expression of the user's customization intent, and is typically stored as an XML document or as an XML file. This generic XML representation of the user's customization intent enables various arbitrary customization technologies to implement the customizations within the application being set up. The customization XML can also be used in other ways, such as logging and for reviewing previous customizations made to an application.

As shown in FIG. 3, another potential input 300 to customization application 208 is an XML document such as customization XML 308 which expresses previous customization intent. Thus, the output 304 of customization application 208 is illustrated in FIG. 3 as customization XML 308(1), which might also be used as input 300 to customization application 208, illustrated as customization XML 308(2). Once a user's customization intent is captured as customization XML 308, it can be consumed by the customization application 208 (application configuration UI 302) in conjunction with application installation package 306. The customization XML 308(2) is used in conjunction with the application installation package 306 to repopulate the UI 302. The repopulated UI 302 presents the user with customization options that indicate previous customizations that are contained in the customization XML 308(2). A user then has the option of altering customizations made previously, in addition to making further customizations. The new or updated customizations are expressed in new customization XML as discussed above.

As noted above, customization XML 308 generated by customization application 208 is a generic entity that can be used to implement the customization intent within the setup application/product using various arbitrary customization technologies. For example, the customization XML 308 can be consumed by Windows Installer Transform technology that generates a transform file to customize the application/product. The customization XML 308 could also be consumed by Windows Installer Patch technology to generate a patch file that customizes the application/product. As noted above, the customization XML 308 can also be consumed by the customization application 208 itself to repopulate the UI 302 and permit a user to review and alter previous customizations. Although it would be highly inefficient, the customization XML 308 could even be consumed by a technology that would generate a list of instructions that a user could follow to perform the customizations manually.

Exemplary Methods

Figure 4:
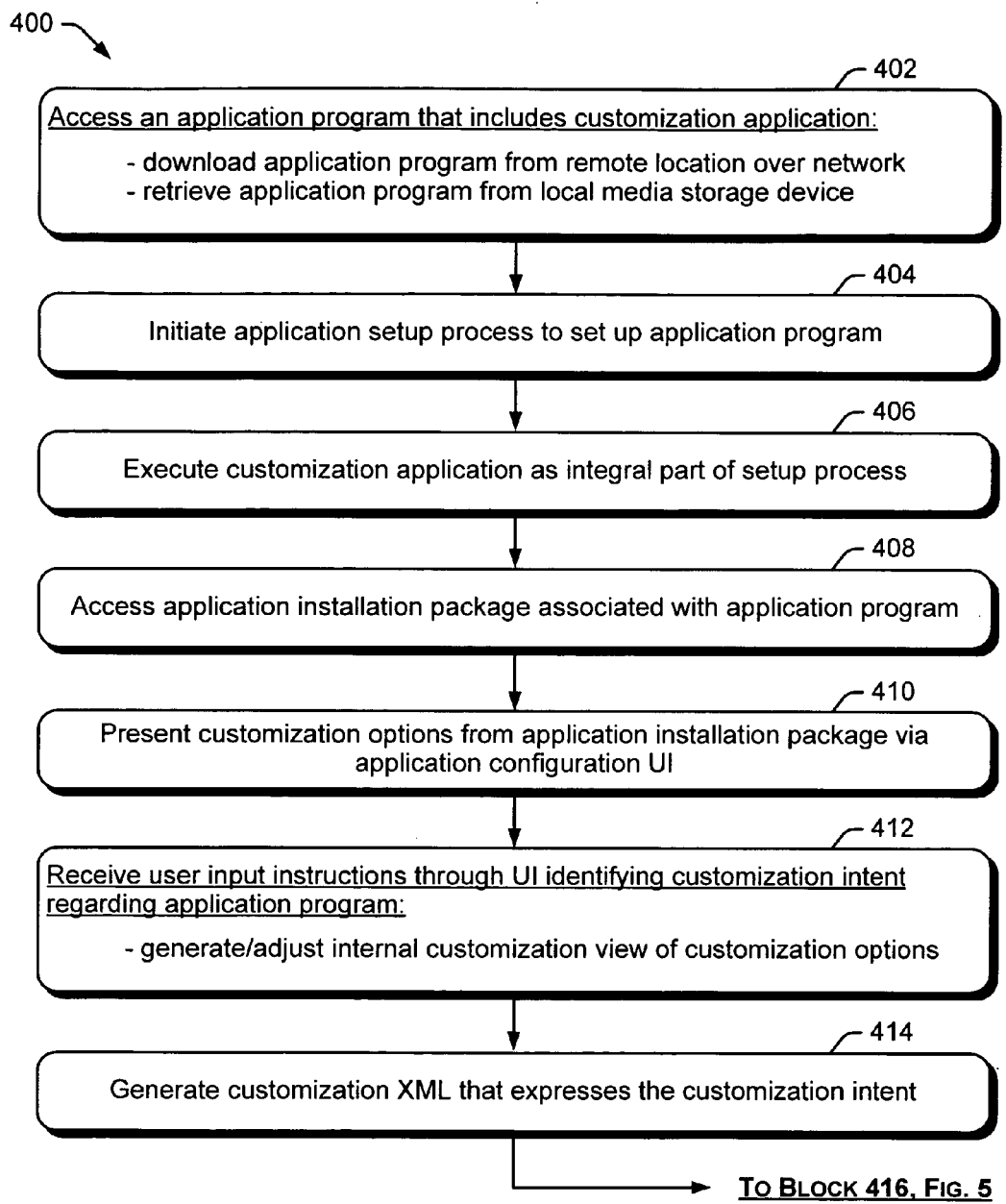
FIGS. 4-5 are flow diagrams illustrating exemplary methods for implementing an integrated application setup for generating customization XML.
Figure 5:
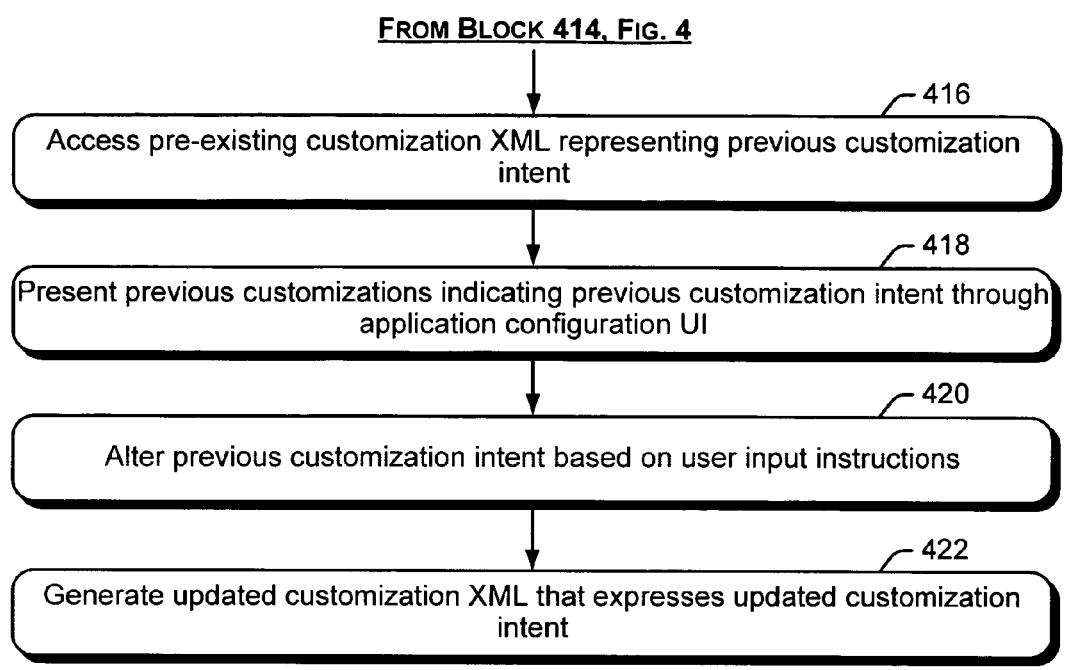

Example methods for implementing an integrated application setup for generating customization XML will now be described with primary reference to the flow diagrams of FIGS. 4-5. The methods apply generally to the exemplary embodiments discussed above with respect to FIGS. 1-3. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 402 of method 400, an application program is accessed. The application program can be accessed in various ways including, for example, by downloading it from a remote location over a network, or by retrieving it from a local media storage device such as a CD. The application program includes a customization application configured to enable the capturing of customization intent and the generation of a record of the customization intent for customizing the application program.

At block 404, an application setup process is initiated to set up the application program. Typically, the setup process is initiated by an administrator or user when they are ready to install the application program on one or more computers. At block 406, the customization application is executed in conjunction with the setup process. The customization application executes to enable capturing the user's/administrator's customization intent for the application program in a manner that is integral with the application setup process.

At block 408, an application installation package is accessed. The application installation package is associated with the application program being set up. One example of an application installation package is an MSI package (Microsoft Windows Installer Package). An MSI package contains a large set of instructions that indicate how a Microsoft Office product is to be installed. The application installation package includes information regarding customization options for the application program being set up.

At block 410, customization options from the application installation package are presented to the user/administrator through an application configuration user interface (UI). The application configuration UI is generated and supported by the customization application. At block 412, user input instructions are received via the application configuration UI. The user input instructions identify a user's customization intent regarding the application program. The user input instructions create an internal customization view that represents the user's customization intent. The customization view continues to change as the user inputs instructions identifying desired customizations for the application program. When the user is finished configuring customization options, the customization view represents the user's customization intent.

At block 414, the customization application generates customization XML that expresses the customization intent. The customization XML is a generic manifestation of the user's/administrator's customization intent, as its use is not restricted to a particular customization technology. The customization XML can be used in various arbitrary customization technologies to implement the customization intent within the target application 204. As noted below with respect to blocks 416-422, the customization XML can also be used to repopulate the application configuration UI so a user can view previous customizations that were made, and make changes to those previous customizations if desired.

At block 416, pre-existing customization XML is accessed. The pre-existing customization XML represents previous customization intent. The pre-existing customization XML is used to present previous customizations to an application program by presenting the previous customization intent through the application configuration UI, as shown at block 418. Customization options presented in the UI from the application installation package (block 410) are presented in light of the previous customization intent from the pre-existing customization XML.

At block 420, the previous customization intent as presented in the UI can be altered based on user input instructions. Thus, a user can review prior customizations applied to the application program and can choose which prior customizations to change and/or retain, and can also include additional customizations. A internal customization view is generated that represents the user's updated customization intent. At block 422, the customization application generates updated customization XML that expresses the updated customization intent.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for expressing customization intent implemented by a computing device, the method comprising:
   accessing an application installation package comprising:
      an executable application;
      instructions for installing the executable application onto the computing device; and
      a customization application that, when executed by the computing device, generates a customization options user interface (COUI);
   executing the instructions for installing the executable application;
   executing the customization application;
   presenting the COUI including customization options from the application installation package that enables a user to select customization options that represents the user's customization intent to the executable application;
   generating customization Extensible Markup Language (XML) content expressing the user's customization intent based on an output from the COUI; and
   in an event that the application installation package further comprises pre-existing customization XML content representing previously generated customization intent:
      accessing the pre-existing customization XML content;
      repopulating the COUI presenting the previously generated customization intent such that previously generated customization intent can be reviewed and user input instructions can be received to change, retain, or remove the previously generated customizations, and add new customizations;
      receiving the user input instructions through the COUI that represent an intent to customize the executable application;
      responsive to receiving the user input instructions:
         iteratively-displaying altered customization intent on the COUI, and
         creating an internal customization view that represents the user's customizations, wherein the internal customization view continues to change as the user input instructions identifying desired customizations on the COUI, when the user input instructions are complete, the internal customization view representing the user's customization intent and as an output from the COUI;
      altering the pre-existing customization XML content based on the output from the COUI; and
      generating updated customization XML content comprising the customization XML content and the altered customization XML content, wherein the updated customization XML content is a generic manifestation of the user's customization intent regarding the executable application, and the updated customization XML content is stored in a computer readable storage medium and made available for subsequent installations of the executable application.

2. A method as recited in claim 1, wherein accessing an application installation package comprises:
   retrieving an application program that includes a customization application.

3. A method as recited in claim 2, wherein retrieving an application program is selected from the group comprising:
   downloading the application program over a network from a remote location; and
   retrieving the application program from a local media storage device.

4. One or more processor-readable storage media encoded with processor-executable instructions that, when executed, configure a computing device to perform the method of claim 1.

5. One or more processor-readable storage media having processor-executable instructions that, when executed, direct a computing device to perform a method comprising:
   accessing an application program that includes an executable application, instructions for installing the executable application, and a customization application, wherein the customization application is configured to:
   generate a user interface (UI);
   execute the instructions for installing the executable application;
   execute the customization application; and
   present the UI including customization options from the application program that enables a user to select customization options that represents the user's customization intent to the executable application;
   generating customization Extensible Markup Language (XML) content expressing the user's customization intent regarding the executable application based on an output from the UI; and
   in an event that the application program further includes pre-existing customization XML content representing previously generated customization intent:
      accessing the pre-existing customization XML content;
      repopulating the UI presenting the pre-existing customization XML content to the user, such that the user can review the previously generated customizations, and the user can input instructions to change, retain, or remove the previously generated customizations, and add new customizations;

receiving user input instructions through the UI that represent an intent to customize the executable application;

responsive to receiving the user input instructions:

iteratively-displaying altered customization intent on the UI, and creating an internal customization view that represents the user's customizations, wherein the internal customization view continues to change as the user input instructions identifying desired customizations on the UI, when the user input instructions are complete, the internal customization view representing the user's customization intent and as an output from the UI;

altering the pre-existing customization XML content based on the output from the UI; and generating updated customization XML content comprising the customization XML content and the altered customization XML content, wherein the updated customization XML content is a generic manifestation of the user's customization intent regarding the executable application.

6. One or more processor-readable storage media as recited in claim 5, wherein receiving user input comprises receiving user input via an application configuration user interface.

7. One or more processor-readable storage media as recited in claim 6, wherein presenting customization options comprises populating the application configuration user interface with the customization options from the application installation package.

8. One or more processor-readable storage media as recited in claim 5, wherein accessing an application installation package comprises:

initiating a setup process to set up the application program; and executing the customization application as an integral part of the setup process to generate the customization XML.

9. One or more processor-readable media as recited in claim 5, wherein generating customization XML comprises executing the customization application as an integral part of a setup procedure for the application program.

10. One or more processor-readable storage media as recited in claim 5, wherein presenting the previous customization intent and receiving user input are achieved via an application configuration user interface supported by the customization application.

11. A computer comprising the processor-readable storage media of claim 5.

12. A system comprising:

a processor;

a memory;

an application program stored in the memory, when executed on the processor performs a method comprising:

accessing the application program that includes an executable application, instructions for installing the executable application, and a customization application, wherein the customization application is configured to:

generate a user interface (UI);

execute the instructions for installing the executable application;

execute the customization application; and present the UI including customization options from the application program that enables a user to select customization options that represents the user's customization intent to the executable application;

generating customization Extensible Markup Language (XML) content expressing the user's customization intent regarding the executable application based on an output from the UI; and in an event that the application program further includes pre-existing customization XML content representing previously generated customization intent:

accessing the pre-existing customization XML content;

repopulating the UI presenting the pre-existing customization XML content to the user, such that the user can review the previously generated customizations, and input instructions to change, retain, or remove the previously generated customizations, and add new customizations;

receiving user input instructions through the UI that represent an intent to customize the executable application;

responsive to receiving the user input instructions:

iteratively-displaying altered customization intent on the UI, and creating an internal customization view that represents the user's customizations, wherein the internal customization view continues to change as the user input instructions identifying desired customizations on the UI, when the user input instructions are complete, the internal customization view representing the user's customization intent and as an output from the UI;

altering the pre-existing customization XML content based on the output from the UI; and generating updated customization XML content comprising the customization XML content and the altered customization XML content, wherein the updated customization XML content is a generic manifestation of the user's customization intent regarding the executable application.

13. The method of claim 1 wherein the COUI presents configuration options comprising:

a plurality of settings for configuring the executable application;

a plurality of features of the executable application; and a default installation state of the executable application.

* * * * *

UNITED STATES PATENT AND TRADEMARK OFFICE
CERTIFICATE OF CORRECTION

PATENT NO. : 7,594,225 B2  
APPLICATION NO. : 11/019115  
DATED : September 22, 2009  
INVENTOR(S) : Paul C. Barr et al.

Page 1 of 1

It is certified that error appears in the above-identified patent and that said Letters Patent is hereby corrected as shown below:

In column 10, line 23, in Claim 2, delete "an" and insert -- the --, therefor.

Signed and Sealed this

Twenty-fifth Day of January, 2011

David J. Kappos
*Director of the United States Patent and Trademark Office*